Aug. 28, 1923.
A. FALSTRAULT
TIRE CHAIN HOOK
Filed March 1, 1923
1,466,615
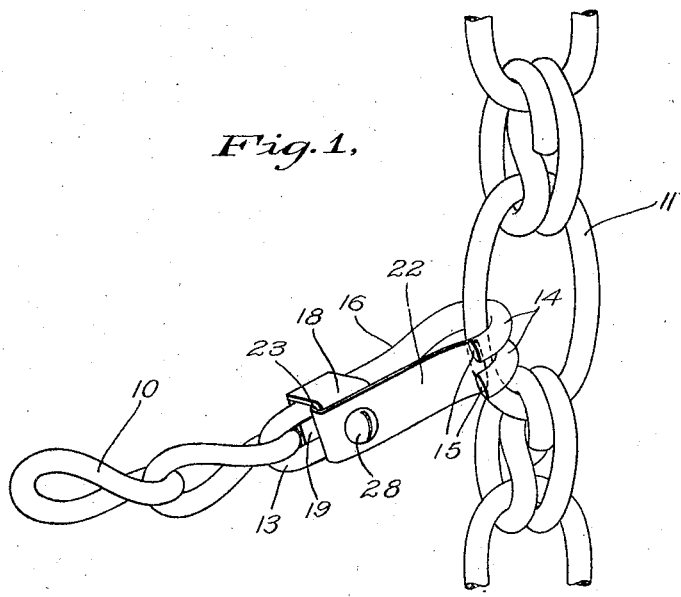
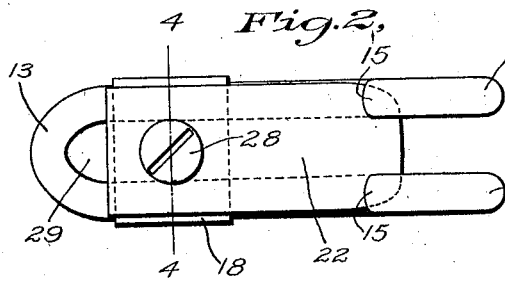
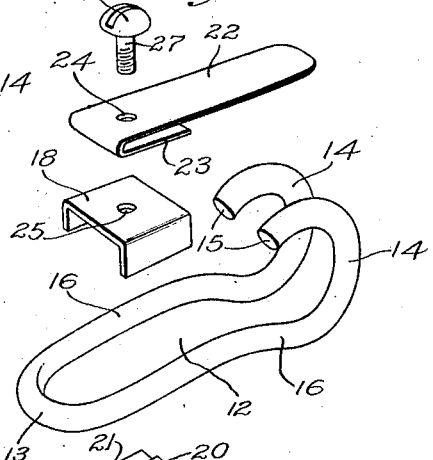
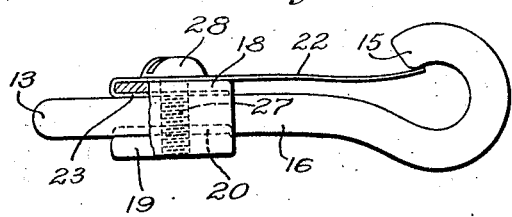
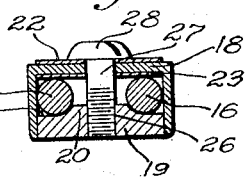
WITNESSES
INVENTOR
ALFRED FALSTRAULT
BY
ATTORNEYS Patented Aug. 28, 1923.

1,466,615

UNITED STATES PATENT OFFICE.

ALFRED FALSTRAULT, OF JERSEY CITY, NEW JERSEY.

TIRE-CHAIN HOOK.

Application filed March 1, 1923. Serial No. 622,221.

*To all whom it may concern:*

Be it known that I, ALFRED FALSTRAULT, a citizen of the United States, and a resident of Jersey City, in the county of Hudson and State of New Jersey, have invented a new and Improved Tire-Chain Hook, of which the following is a full, clear, and exact description.

This invention has relation to anti-skid tire chains and has particular reference to an improvement in the hook which connects the cross chains to the side chains. This mode of attaching or detaching cross chains and side chains with one another, in addition to requiring an unnecessary expenditure of time and labor, is crude and inefficient in practice and repeated bending of the hooked ends of the hook members materially decreases the life of the hook members.

It is therefore an object of the present invention to provide a hook of this character which facilitates the connection or disconnection from the cross and side chains and which operates as an effectual means of connection therebetween.

As a further object the invention contemplates an attachment for the usual form of hook of this character, which attachment converts the hook into a snap hook and which attachment is readily applicable to or removable from the hook element when desired whereby the hook element may be attached to or removed from the end link of a cross chain.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the term in which the claims are expressed.

In the drawing—

Figure 1 is a fragmentary perspective view illustrating a hook member constructed in accordance with the invention in its applied position on a tire chain.

Fig. 2 is a face view of the hook.

Fig. 3 is a side view thereof.

Fig. 4 is a sectional view therethrough taken approximately on the line 4—4 of Fig. 2.

Fig. 5 is a collective perspective view illustrating the hook member and the elements of the attachment in disassociated relation.

Referring to the drawing by characters of reference, 10 designates a portion of a cross chain and 11 a portion of the side chain of a tire chain structure. The common form of hooks 12 which are now employed for connecting the cross chains to the side chains are of substantially U-shaped formation with their bight portion 13 engaging the end link of the cross chain and their free ends 14 bent in hook form to fit around one of the links of the side chain after which the extremities 15 are hammered into engagement with the side legs 16 of the hook members 12 to retain the same in substantially eye form and prevent accidental displacement of said hooked ends 14. In practice, it is therefore necessary to pry the extremities 15 away from the side legs 16 to disengage the hooked ends 14 from the side chains 11. Repeated bending of the hooked ends 14 tends to weaken the hook members 12 and limits their life or usefulness. Furthermore it is not unusual that in re-applying the hook member to the side chain, that the extremities 15 are not bent far enough to insure against their disengagement which may result in the cross chains becoming loose and damaging the fenders or body of the automobile.

The present invention therefore contemplates an attachment for the hook member 12 of the character set forth which consists of a base comprising a U-shaped section 18 which is adapted to extend transversely across the side legs and embrace the same and a second section 19 having a central longitudinal rib 20 providing rabbets 21 at opposite sides there which receive the side legs. The attachment further includes a leaf spring 22 provided at its inner end with a parallel return bend 23, between which and the end of the main body portion of the spring the U-shaped section 18 is received. The spring and return bend are provided with aligned apertures 24, the U-shaped section 18 with an aperture 25 and the section 19 with an interiorly threaded socket 26. In assembling the attachment with the hook member 12 the sections 18 and 19 entirely embrace the side legs 16 adjacent the bight end 13 with the spring 22 embracing the U-shaped section 18. A screw 27 having a kerfed head 28 is inserted through the aligned apertures 24, 25 and threadedly anchored in the socket 26. The free end of the spring 22 projects toward and underlies the extremities 15 of the hooked ends 14, the inherent resiliency of said spring member maintaining its free end against the extremities 15 while yieldably permitting the snapping of the hooked ends 14 into engagement with the links of the side chains 11. The sections 18 are sufficiently spaced from the bight 13 to form in conjunction therewith a loop or eye 29 for the reception of the end link of the cross chain 10 which is applied to the hook member 12 prior to the association of the attachment therewith.

I claim:

1. An attachment for the hook member of a tire chain which connects the cross chains to the side chains, comprising a leaf spring adapted to yieldably engage at its free end with the hooked extremities of the hook member, means for detachably clamping the opposite end of said spring to the bight end of the hook member, said latter means comprising clamping sections, and means extending through said clamping sections and the spring for retaining the same against separation.

2. An attachment for the hook member of a tire chain which connects the cross chains to the side chains, comprising a leaf spring adapted to yieldably engage at its free end with the hooked extremities of the hook member, and means for detachably clamping the opposite end of said spring to the bight end of the hook member, comprising a pair of clamping sections one of which is of substantially U-shaped cross sectional configuration, and the other of which is provided with a longitudinal rib on opposite sides of which the arms of the hook member are arranged, and a screw extending through the clamping sections and the spring for retaining the same against relative separation.

ALFRED FALSTRAULT.